United States Patent

[11] 3,544,008

[72] Inventors Neville H. Reiners;
Julius P. Perr, Columbus, Indiana
[21] Appl. No. 788,387
[22] Filed Jan. 2, 1969
[45] Patented Dec. 1, 1970
[73] Assignee Cummins Engine Company, Inc.
Columbus, Indiana
a corporation of Indiana

[54] FUEL INJECTOR
21 Claims, 18 Drawing Figs.
[52] U.S. Cl. ..................................................... 239/90,
239/533
[51] Int. Cl. ....................................................... F02m 47/02

[50] Field of Search ............................................. 239/533, 90

[56] References Cited
UNITED STATES PATENTS
3,351,288  11/1967  Perr .............................  239/90(X)

*Primary Examiner*—Lloyd L. King
*Assistant Examiner*—Gene A. Church
*Attorney*—Hibben, Noyes & Bicknell ABSTRACT: A fuel injector for injecting fuel into a cylinder of an internal combustion engine, wherein the maximum stroke of a shiftable piston in the injector determines the maximum quantity of fuel injected by the injector during each cycle of operation thereof.

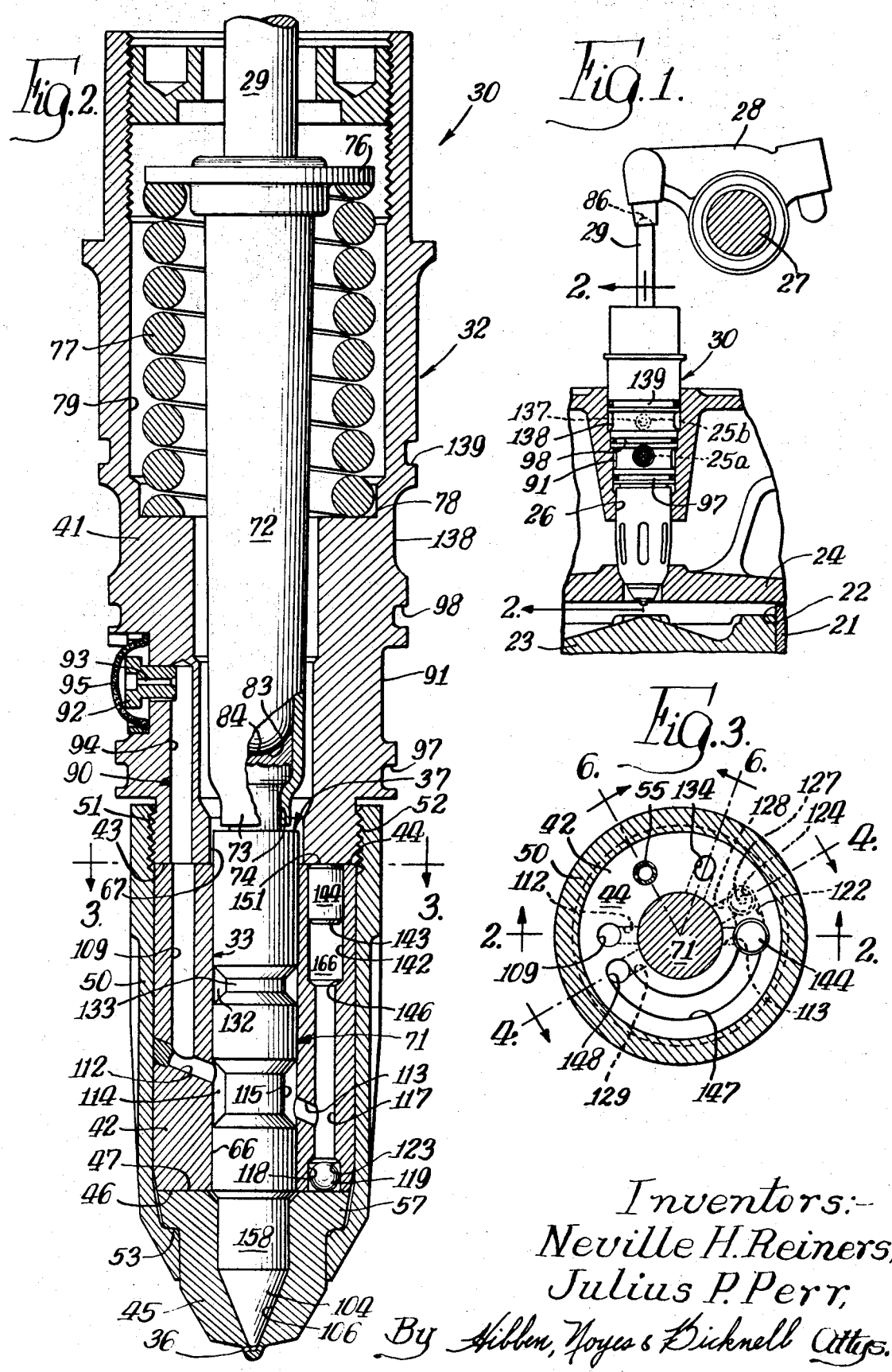

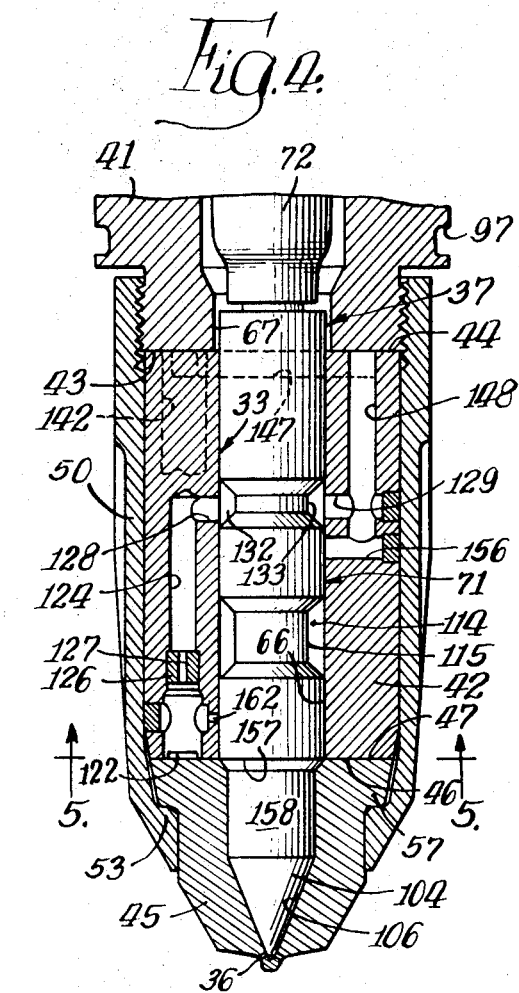
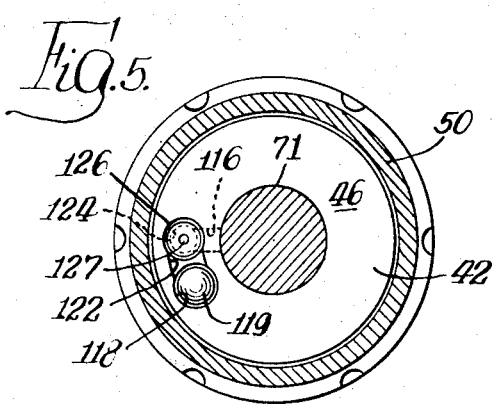
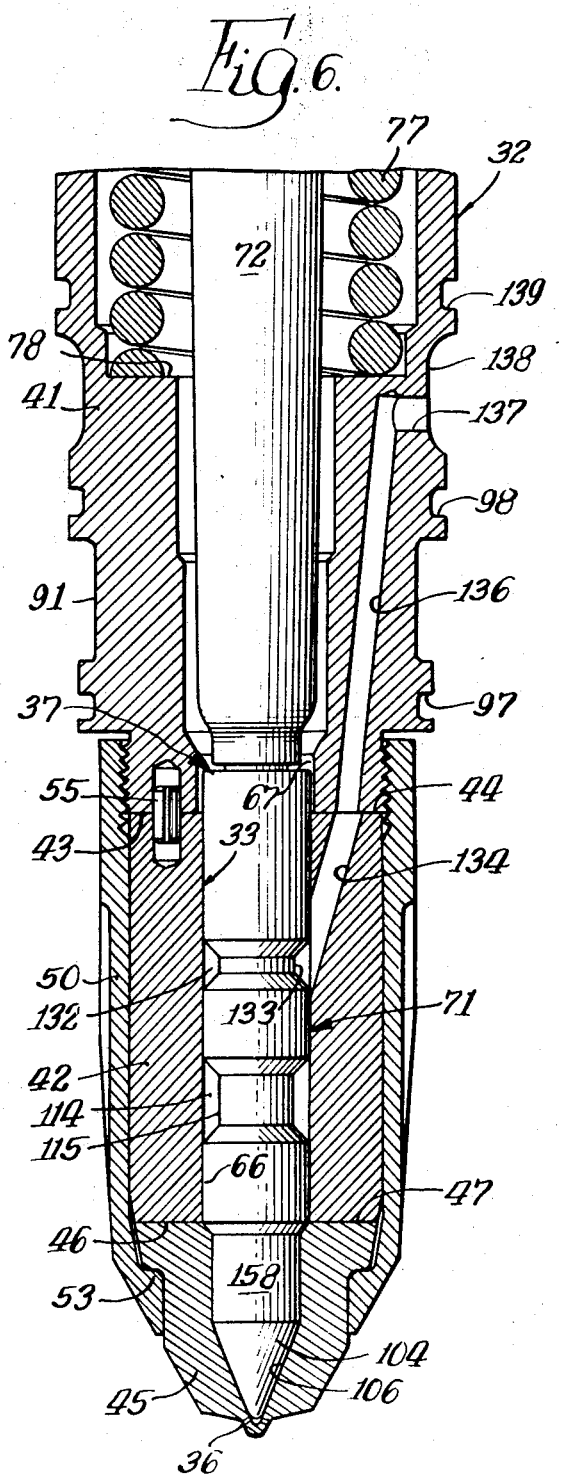

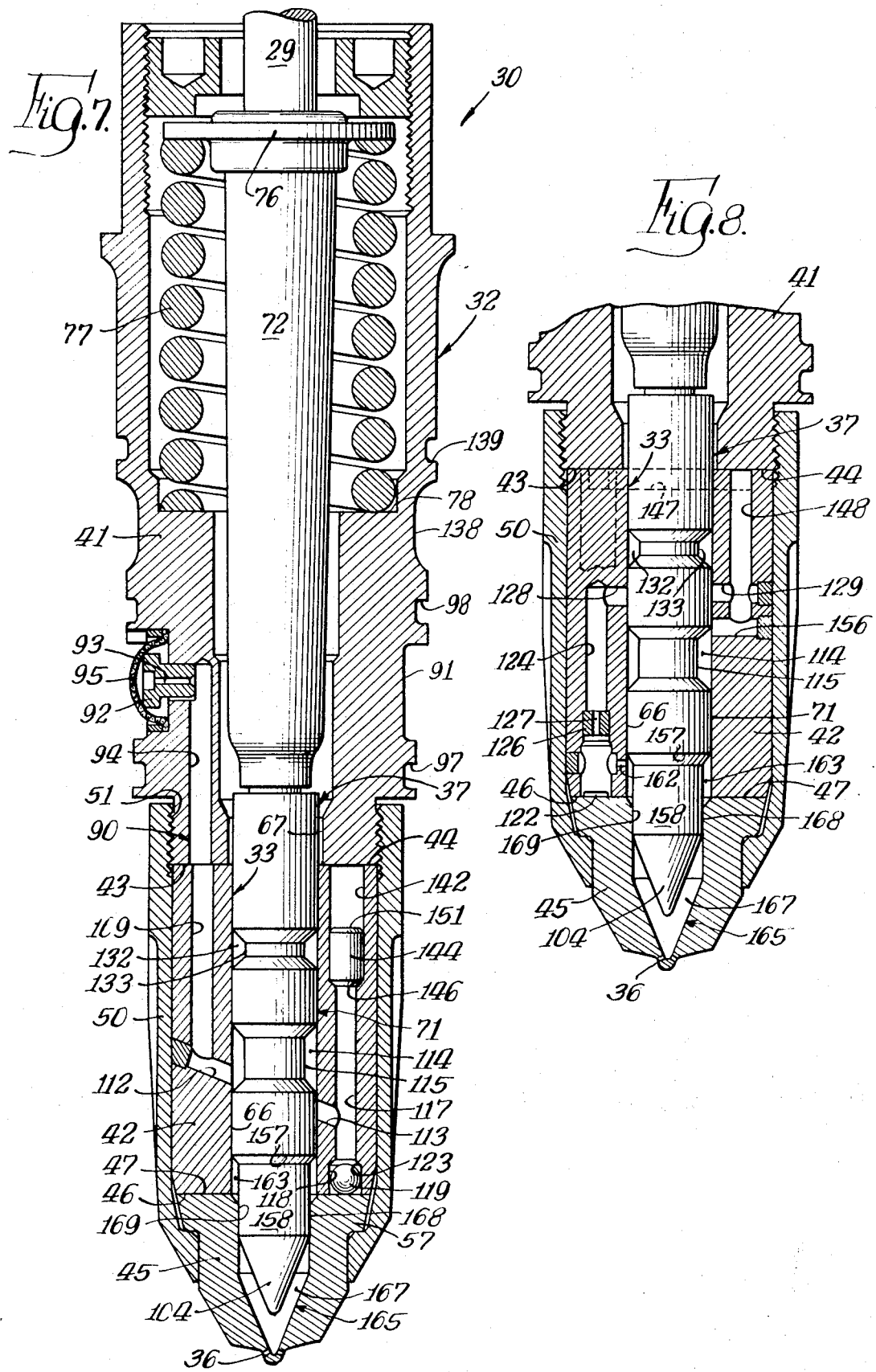

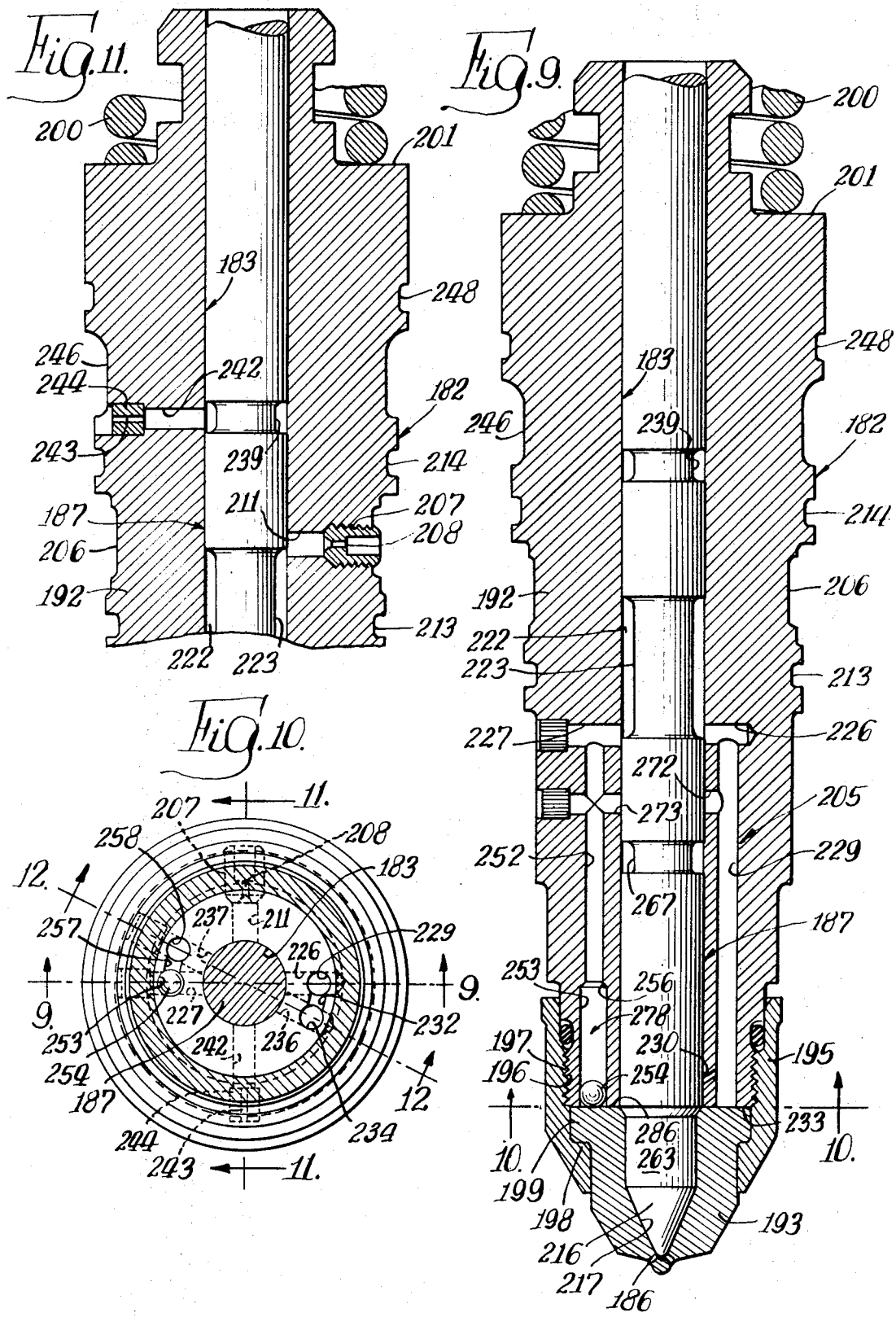

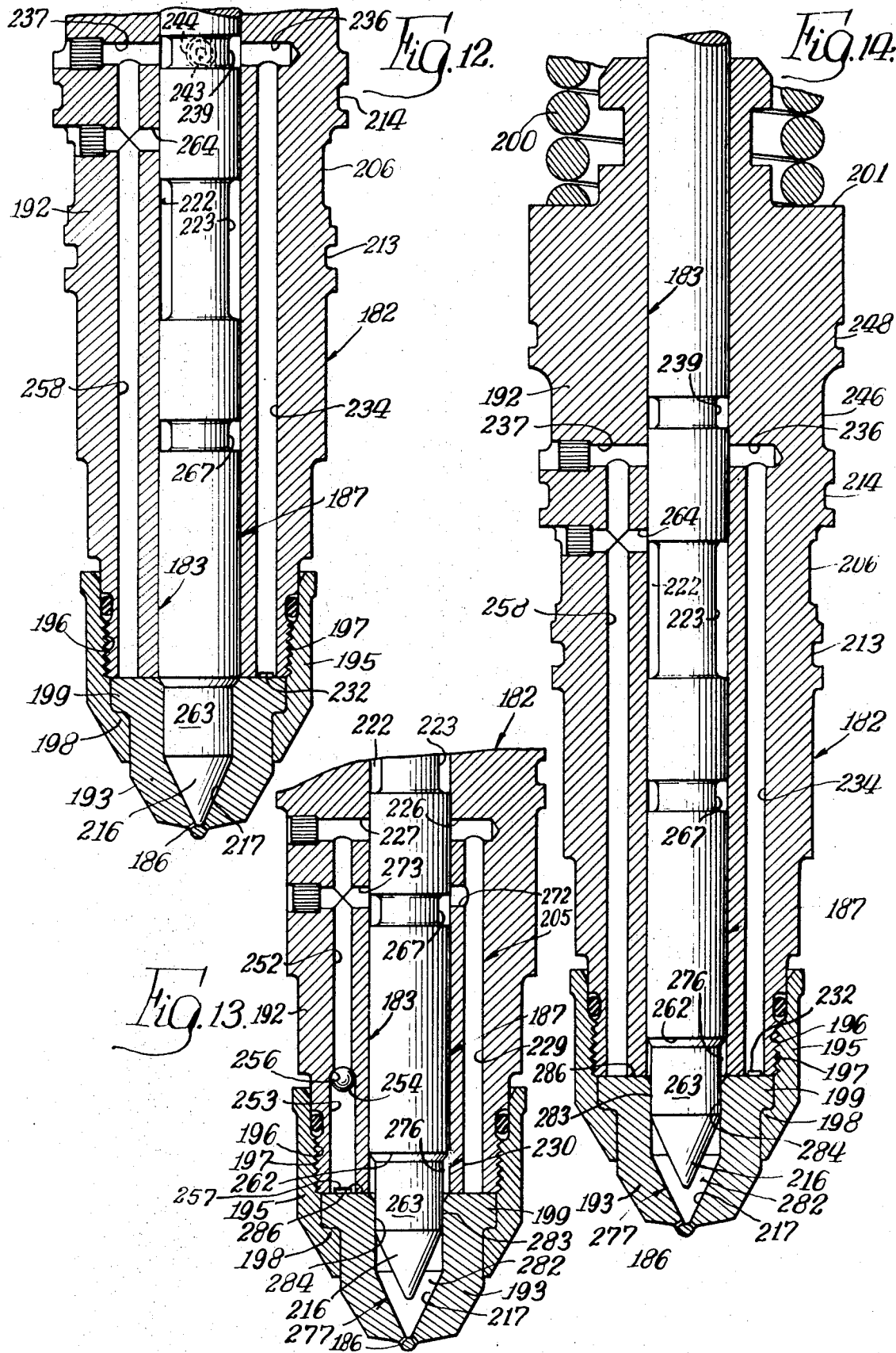

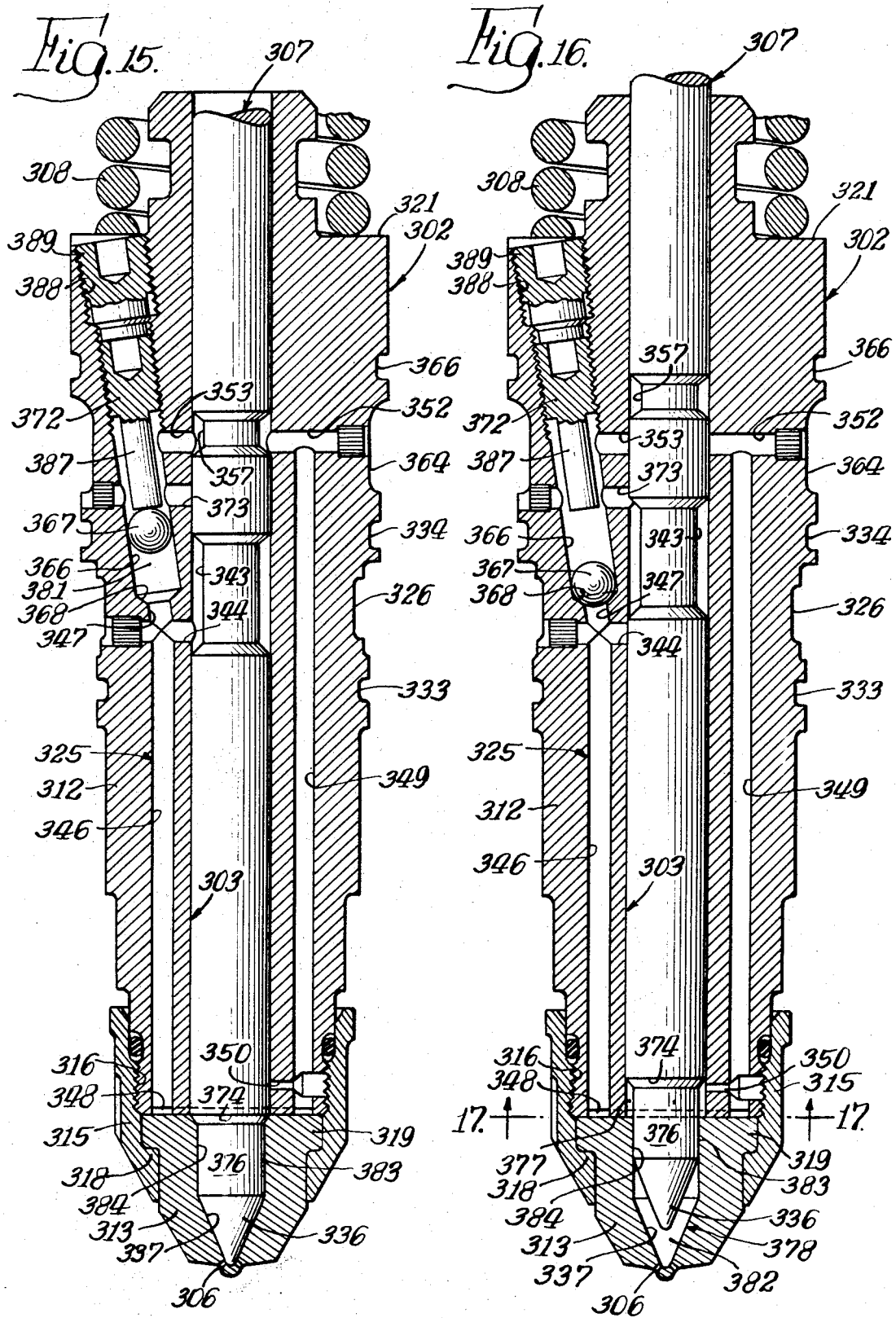

FUEL INJECTOR

This invention relates to a fuel injector for internal combustion engines, and more particularly to a fuel injector wherein the maximum quantity of fuel delivered by the injector is limited.

One of the problems experienced by manufacturers of internal combustion engines is that of increased warranty expenses due to premature failure of major engine components. Such premature failure is attributable, in many instances, to tampering with or unauthorized modification of the fuel system of the engine by the user to cause overfueling and thus increase the maximum power output of the engine above its normal rating. Such practice is also undesirable for other reasons, namely, the production of excessive exhaust smoke and loss of or erratic throttle response. Consequently, in addition to increasing the warranty expenses of the engine manufacturer, the aforementioned practice is also undesirable from an air pollution and safety standpoint.

Accordingly, it is a general object of the invention to provide a novel fuel injector for supplying fuel to an internal combustion engine, which cannot be tampered with by modifying or altering to cause overfueling.

Another object is to provide a novel fuel injector for use in a fuel supply system for an internal combustion engine, wherein the maximum quantity of fuel delivered by the injector is unaffected by abnormal adjustments or modifications of other parts of the system.

A more particular object is to provide a novel fuel injector having a piston shiftably mounted therein, wherein the maximum stroke of the piston determines the maximum quantity of fuel injected by the injector.

Still another object is to provide a novel fuel injector of the foregoing character, which cannot be easily dismantled or tampered with to increase the quantity of fuel delivered thereby above a predetermined maximum.

Other objects and advantages will become apparent from the following detailed description and accompanying drawings, wherein:

FIG. 1 is a fragmentary cross-sectional view of a portion of an internal combustion engine including a fuel injector embodying the features of the invention;

FIG. 2 is an enlarged longitudinal sectional view of the injector illustrated in FIG. 1, with some parts shown in elevation and with portions thereof shown broken away, taken substantially along the line 2-2 of FIG. 1;

FIG. 3 is a transverse sectional view taken along the line 3-3 of FIG. 2;

FIG. 4 is a fragmentary longitudinal sectional view taken along the line 4-4 of FIG. 3;

FIG. 5 is a transverse sectional view taken along the line 5-5 of FIG. 4;

FIG. 6 is a longitudinal sectional view taken along the line 6-6 of FIG. 3;

FIG. 7 is a longitudinal sectional view, similar to FIG. 2, but showing certain parts of the injector in a different position;

FIG. 8 is a fragmentary longitudinal sectional view, similar to FIG. 4, but showing certain parts of the injector in a different position;

FIG. 9 is a longitudinal sectional view, with some parts shown in elevation, of another injector embodying the features of the invention;

FIG. 10 is a transverse sectional view taken along the line 10-10 of FIG. 9;

FIG. 11 is a fragmentary longitudinal sectional view, taken along the line 11-11 of FIG. 10, of the upper portion of the injector illustrated in FIG. 9;

FIG. 12 is a fragmentary longitudinal sectional view, taken along the line 12-12 of FIG. 10;

FIG. 13 is a fragmentary longitudinal sectional view, similar to FIG. 9, but showing certain parts of the injector in different positions;

FIG. 14 is a longitudinal sectional view, similar to FIG. 12, but showing certain parts of the injector in different positions;

FIG. 15 is a longitudinal sectional view, with some parts in elevation, of another injector embodying the features of the invention;

FIG. 16 is a view similar to FIG. 15, but showing certain parts of the injector in different positions;

Figure 18:
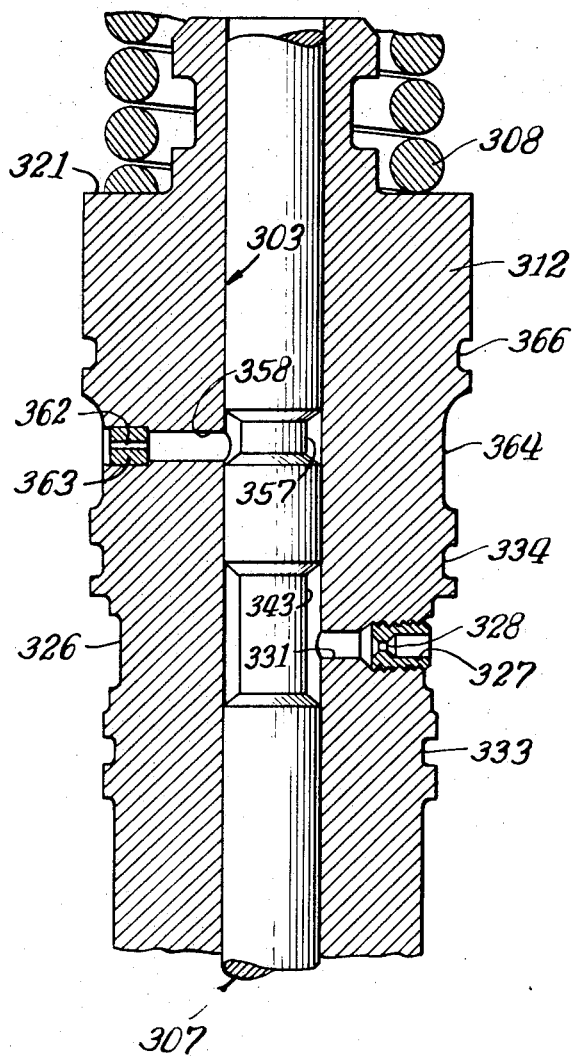
Figure 17:
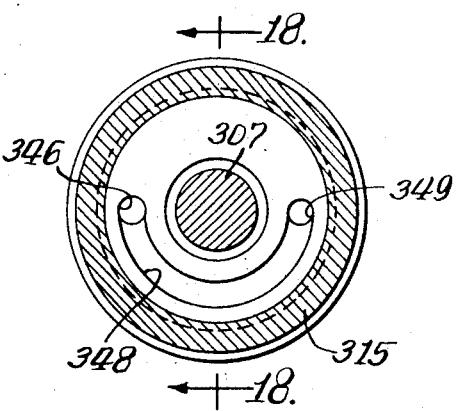

FIG. 17 is a transverse sectional view taken along the line 17-17 of FIG. 16; and FIG. 18 is a fragmentary longitudinal sectional view, taken along the line 18-18 of FIG. 17, of the upper portion of the injector illustrated in FIGS. 15 and 16.

Briefly described, the present invention contemplates a novel fuel injector for use in a fuel supply system for an internal combustion engine of the diesel type. A system with which the present injector is adapted for use is disclosed and claimed in U.S. Pat. No. 3,159,152, issued Dec. 1, 1964 to Reiners. The injector contemplated herein has an elongated body having a plunger bore therein and a plunger reciprocably mounted in the bore. A fuel injection chamber at the end of the body for receiving a quantity of fuel is provided, the fuel being injected by the plunger into an associated cylinder of the engine through a nozzle at one end of the body.

The injector body also includes a fuel passage adapted to be connected at one end to a source of fuel under pressure and having a connection with the fuel injection chamber and another connection connected to a drain. The plunger is operable when in one position to establish a flow through the fuel passage from the source to the other connection and thus to drain. The plunger is also operable when in another o position to interrupt flow through the other connection and to establish flow through the first mentioned connection to the fuel injection chamber.

The fuel injector to be hereinafter described in detail also includes novel means for limiting the maximum quantity of fuel capable of being supplied to the fuel injection chamber for injection into the associated cylinder. Such means preferably comprises cylinder means constituting part of a branch portion of the fuel passage, and a piston mounted in the cylinder means. The piston is shiftable in the cylinder means and defines a fuel limiting chamber at one side thereof having a volume which varies with the stroke of the piston. The arrangement is such that during one portion of the operating cycle of the injector, the piston is moved by the pressure of the fuel supplied to the injector in a direction to create the fuel limiting chamber and fill the chamber with fuel. During another portion of the operating cycle of the injector, the pressure of the fuel is utilized to move the piston in the opposite direction to transfer a quantity of fuel into the fuel injection chamber equal to that in the fuel limiting chamber. The maximum stroke of the piston is limited and therefore the maximum volume of the fuel limiting chamber is limited. Consequently, the maximum quantity of fuel that can be injected by the injector during any one cycle of operation is also limited, regardless of the pressure of the fuel supplied to the injector from the source or the degree of restriction of the flow to drain.

In FIG. 1, a fragment of a multicylinder internal combustion engine, in this instance, a diesel engine, is illustrated. Such engine comprises a cylinder block 21 having a plurality of cylinders provided with reciprocable pistons. Only a portion of one cylinder 22 and one piston 23 are shown in FIG. 1.

The fragment of the engine illustrated in FIG. 1 also includes a cylinder head 24 mounted on the block 21 and having stepped injector mounting bores 26 therein, one for each of the respective cylinders. A fuel injector 30, embodying the features of the invention, is mounted in each of the bores 26. The cylinder head 24 may also be provided with a pair of longitudinally extending, vertical spaced bores 25a and 25b which intersect each mounting bore 26. The bores 25a and 25b form part of a fuel system for supplying fuel under pressure to and for conducting fuel from the injectors. In the present instance, the bore 25a supplies fuel under a controlled pressure to the injector 30, and the bore 25b conducts fuel from the injectors to drain.

The fragment of the engine illustrated in FIG. 1 also includes a rock shaft 27 extending lengthwise of the engine and having a plurality of rocker arms mounted thereon, each indicated at 28, and there being one for each injector. Each rocker arm 28 is adapted to be rocked on the shaft 27 by means such as a push rod (not shown) and an engine driven cam (also not shown). Movement of each rocker arm 28 is transmitted to its associated injector 30 by a link 29.

The Embodiment Shown in FIGS. 2—8

Referring now to FIGS. 2—8, inclusive, the injector 30 comprises an elongated injector body 32 having a plunger bore 33 therein and including a nozzle having at least one and preferably a plurality of nozzle openings 36 therein through which fuel is injected into the associated cylinder. A plunger, indicated generally at 37, is reciprocably mounted in the bore 33.

The injector body 32, in the present instance, comprises a generally cylindrical body member 41, a barrel member 42, and a nozzle member 45 provided with the nozzle openings 36 are arranged in end-to-end relation. The end faces, indicated at 43 and 44 of the body and barrel members 41 and 42, respectively, abut each other and the end faces, indicated at 46 and 47 of the barrel and members 42 and 45, respectively, also abut each other.

For holding the parts of the injector body 32 assembled in end-to-end relation, a tubular retainer 50 is provided. To this end, the upper end of the retainer 50 is internally threaded, as at 51, for engagement with external threads 52 on the lower end of the body member 41, as viewed in FIG. 2. The lower end of the retainer 50 is provided with an internal flange 53 for engaging an annular, radially outwardly extending flange 57 on the nozzle member 45. Thus, when the retainer 50 is threaded onto the body member 41, the end faces 43,44 and 46,47 of the body member 41, barrel member 42 and nozzle member 45 are held in abutting engagement. A pin 55 FIGS. 3 and 6 6) assures accurate circumferential alinement between the body member 41 and barrel member 42.

As heretofore mentioned, the injector body 32 is provided with a bore 33 for receiving the plunger 37. The bore 33 includes a portion 66 in the barrel member 42 and a portion 67 in the body member 41, having various diameter counterbores, the portion 67 being of somewhat larger diameter than the portion 66 in the barrel member 42 so that the upper part of the plunger 37 does not contact the body member 41. The interior of the nozzle member 45 constitutes a continuation of the plunger bore 33.

The plunger 37, which comprises a fuel injection means in the injector 30, includes a fuel injection and control portion 71, and a sleeve portion 72, the lower end of which, indicated at 73, is secured to the upper end of the portion 71 of the plunger 37, preferably by rolling or otherwise forming the end 73 of the sleeve portion 72 into a circumferential groove 74 (FIG. 2) formed on the end of the plunger portion 71. The outside diameter of the sleeve portion 72 is somewhat less than that of the counterbored portion 67 so that the sleeve portion 72 fits loosely in the portion 67 of the plunger bore throughout the range of movement of the plunger. A flange 76 is secured to the upper end of the sleeve portion 72 to provide an abutment for one end of a coil spring 77 disposed around the sleeve portion 72. The other or lower end of the coil spring 77 bears against a shoulder 78 and defined by a large counterbore 79 in the upper end of the body member 41. The spring 77 is normally under compression and serves to urge the plunger 37 away from the nozzle openings 36.

Movement of the plunger 37 toward the nozzle opening 36 is effected by the rocker arm 28 acting through the link 29. The lower end, indicated at 83 (FIG. 2), of the link 29, is spherically formed and engages a complementally shaped seat 84 in the upper end of the portion 71 of the injector plunger 37. The upper end, indicated at 86, of the link 29, is similarly formed for engagement with a seat at one end of the rocker arm 28.

As heretofore mentioned, the injector body 32 has a fuel passage therein, indicated generally at 90, adapted to be connected to a source of fuel under pressure and having a connection for supplying fuel to a fuel injection chamber in the injector for injection therefrom through the nozzle openings 36 into the associated cylinder. To connect the passage with the source, the injector body 41 is provided with an external annular groove 91 positioned to register with the fuel supply line 25a in the cylinder head 24, as illustrated in FIG. 1, when the injector is fully seated in its mounting bore 26. A plug 92, having a balancing orifice 93, extends inwardly from the groove 91, with the orifice 93 communicating with the upper end of a vertical bore 94 in the injector body member 41. The vertical bore 94 forms part of the fuel passage 90 and the balancing orifice 93 in the plug 92 comprises one end of the fuel passage. The orifice 93 serves to meter the flow of fuel entering the fuel passage in the injector. A filtering screen 95 may be mounted in the groove 91 over the plug 92 to prevent foreign particles from entering the fuel passage. A pair of smaller grooves 97 and 98 may be provided on each side of the groove 91 for receiving seals, such as 0-rings shown in FIG. 1, to prevent leakage from the lower and upper sides, respectively, of the groove 91.

Assuming the injector plunger 37 is in the position thereof illustrated in FIG. 2, which is the position it would occupy at the beginning of an injection cycle, the tapered lower end, indicated at 104, of the plunger will be seated on a complementally shaped inner surface 106 in the nozzle member 34. When the plunger is so positioned and assuming the beginning of an injection cycle, fuel under pressure from the fuel supply bore 25a will flow through the balancing orifice 93 in the plug 92 and enter the upper end of the vertical bore 94. The flow then proceeds downwardly in the bore 94 and into the upper end of another vertical bore 109 in the barrel member 42. The flow then enters a portion 112 of a diagonal bore 112,113 in the barrel 42, which intersects the portion 66 of the plunger bore 33. Before reaching the portion 113, the flow passes through an annular space 114 in the plunger bore 33, defined by an annular groove 115 around the portion 71 of the injector plunger 37. On passing through the space 114, the flow enters the portion 113 of the diagonal bore 112,113 and then flows into another vertical bore 117 in the barrel member 42. On entering the vertical bore 117, the flow splits, part of the flow proceeding downwardly in the portion of the bore 117 below the intersection of the portion 113 of the bore 112,113 therewith. On reaching the lower end of the bore 117, this portion of the flow enters an enlarged portion 118 of the bore 117 and then passes around a check ball 119 mounted in the portion 118. The seat for the check ball 119 is provided by a shoulder 123 above the ball and defined by the enlarged portion 118 of the bore 117. The flow then passes around the ball 119 and enters a shallow arcuate groove 122 FIGS. 3, 4, 5 and 8) in the end face 46 of the barrel member 42.

From the arcuate groove 122, the flow enters the lower end of another vertical bore 124 (FIGS. 3, 4, and 5) in the barrel member 42 and continues upwardly therein. A plug 126 having an orifice 127 therein is mounted in the bore 124 for restricting the flow through this portion of the fuel passage.

From the upper end of the bore 124, the flow enters a portion 128 of a transverse bore 128,129 in the barrel member 42, which intersects the portion 66 of the plunger bore 33. Before reaching the portion 129, the flow enters an annular space 132 in the portion 66 of the plunger bore 33, defined by another groove 133 in the portion 71 of the injector plunger.

From the annular space 132, the flow enters the lower end of an inclined bore 134 (FIGS. 3 and 6) in the barrel member 42 and proceeds upwardly therein and in another inclined bore 136 in the body member 41 to a short, transverse bore 137 in the body member 141. The bore 137 opens into a groove 138 around the body member 41, which communicates with the drain or return bore 25b (FIG. 1) in the cylinder head 24 of the engine. A shallow groove 139 is provided in the injector body 41 above the groove 138 for receiving a seal, such as an 0-ring, to prevent fuel leakage from the upper side of the groove 138.

Thus, the aforementioned series of interconnected bores through the injector body 32, beginning with the balancing orifice 93 and terminating with the lower portion of the vertical bore 124 below the restriction 127, comprise the fuel passage or passages through the injector body that are adapted to be connected to a source of fuel under pressure, namely the fuel supply bore 25a. The flow through such passage serves, in part, to purge the injector of gases that may have accumulated in the passage.

As heretofore mentioned, the fuel passage in the injector body 32 also includes a branch portion having its opposite ends connected to the fuel passage. Thus, upon entering the portion of the vertical bore 117 (FIG. 2) above the bore portion 113, which comprises one end of the branch portion, the flow proceeds upwardly in the bore. The flow thereafter enters the lower end of a counterbore 142 of the vertical bore 117 and acts against one face, in this instance the lower face 143, of a piston 144 reciprocably mounted in the counterbore 142. The intersection of the upper end of the bore 117 with the counterbore 142 defines a shoulder 146 comprising a stop for limiting downward movement of the piston 144 in the counterbore 142. In FIG. 7, the piston 144 is shown engaged with the shoulder 146.

An arcuate groove 147 (FIGS. 3, 4 and 8) in the upper end face 44 of the barrel member 42 has one end thereof intersecting the upper end of the counterbore 142. The opposite end of the groove 147 intersects the upper end of another vertical bore 148 extending downwardly in the barrel member 42. The lower portion of the bore 148 intersects the other portion 129 of the transverse bore 128,129 and hence communicates with the annular space 132 defined by the plunger groove 133. The portion 129 of the transverse bore 128,129 comprises another end of the branch portion. The space 132, is, of course, connected to the drain bores 134, 136 and 137 (FIG. 6) when the plunger 137 is in the position shown in FIGS. 2, 4 and 8. Consequently, the space above the upper or opposite face, indicated at 151, of the piston 144 also communicates with the drain bores 134, 136 and 137. The branch portion of the fuel passage 90 thus comprises the portion of the vertical bore 117 above the transverse bore 112,113, together with the counterbore 142, arcuate groove 147, vertical bore 148 and portion 129 of the transverse bore 128,129. In addition, the piston 144 and counterbore 142 comprise piston and cylinder means in the branch portion of the fuel passage.

In the injection cycle, the piston 144 will be moved upwardly in its bore 142 by an amount dependent on the amount of fuel flowing upwardly in the vertical bore 117. Such movement will continue as the plunger 37 begins to move upwardly in its bore until the groove 115 moves past the adjacent end of the portion 113 of the diagonal bore 112,113. When this occurs, the flow of fuel through the portion 113 of the diagonal bore 112,113 is interrupted. Consequently, no further upward movement of the piston 144 in its bore 142 will occur. During upward movement of the piston 144, fuel in the space above the upper end face 151 thereof is displaced through the connected bores 134, 136 and 137 to drain.

Continued upward movement of the plunger 37 in its bore 33 causes the groove 133 to move beyond the inner ends of the portions 128 and 129 of the transverse bore 128,129 (FIG. 8), thus interrupting communication therebetween. Shortly after this occurs, the groove 115 will move over and provide communication between the inner end of a short transverse bore 156 in the barrel member 42 below the transverse bore 128,129. The groove 115 is of sufficient length so that when it establishes communication with the bore 156, it is also in communication with the portion 112 of the diagonal bore 112,113. The bore 156 is intersected by the lower end of the bore 148. At about the same time or shortly after the groove 115 moves out of communication with the inner end of the transverse bore 156, a shoulder 157 (FIGS. 7 and 8) defined by a reduced diameter portion 158 at the lower end of the plunger 37, moves past and uncovers a small transverse bore or feed hole 162 in the barrel member 42. The inner end of the feed hole 162 intersects the portion 66 of the plunger bore 33 and the outer end of the feed hole 162 intersects the lower end of the vertical bore 124 below the plug 126.

Thus, as the plunger 37 moves upwardly in its bore from the position thereof illustrated in FIGS. 2, 4 and 6 to the position thereof illustrated in FIGS. 7 and 8, upward flow of fuel in the bore 117 is shut off and thus upward movement of the piston 144 in its bore is terminated. Thereafter, communication is established between the portion 112 of the diagonal bore 112,113 and the transverse bore 156 so that the pressure of the fuel in the portion 112 is applied to the upper end face 151 of the piston 144. Subsequently, the feed hole 162 (FIG. 2) is uncovered so that communication is established between the lower end of the vertical bore 124 and the upper portion, indicated at 163 (FIGS. 7 and 8), of a fuel injection chamber 165, the portion 163 being defined by the reduced diameter portion 158 of the plunger and the plunger bore 66. Under these conditions, the piston 144 moves downwardly in its bore. Such movement causes a quantity of fuel equal to that displaced by downward movement of the piston to be forced through the feed hole 162 into the portion 163. The feed hole 162 thus comprises a connection between the fuel passage 90 and the fuel injection chamber 165, and the space between the lower face 143 of the piston 144 and the shoulder 146 constitutes another chamber 166, the function of which will be hereinafter described. The quantity of fuel transferred to the portion 163 is subsequently forced by movement of the plunger 37 to the lower portion, indicated at 167, of the fuel injection chamber 165, the portion 167 being defined by the interior of the nozzle member 45 and the tapered lower end 104 of the injection plunger 37. Such transfer to the portion 167 of the fuel injector chamber 165 occurs through a small annular space 168 between the reduced diameter portion 158 of the plunger and the adjacent wall, indicated at 169, of the nozzle member 45. Continued downward movement of the plunger 37 causes the fuel in the portion 167 to be injected into the cylinder through the nozzle openings 36.

The orifice 127, the portion of vertical bore 124 thereabove, portion 128 of transverse bore 128,129, annular space 114, inclined bore 134 in the barrel member 42, and the connected inclined and transverse bores 136 and 137, respectively, in the body member 41, comprise another connection between the fuel passage and drain.

As mentioned above, the quantity of fuel supplied to the fuel injection chamber 165 is equal to that in the chamber 166 or that displaced by downward movement of the piston 144 from an elevated position thereof in its bore 142 to its lowest position in the bore. However, since the maximum extent of upward movement of the piston 144 in its bore 142 is determined by the end face 43 of the body member 41, the maximum volume of the chamber 166 is limited. The end face 43 of the body member 41 thus comprises stop means for limiting movement of the piston 144 in one direction, namely, in an upward direction as viewed in FIGS. 2 and 7. Since the maximum stroke of the piston 144 is limited, a quantity of fuel greater than that contained in the chamber 166, when the piston 144 is in its uppermost position, cannot be transferred to the fuel injection chamber 165 for injection into the associated cylinder. The chamber 166 thus comprises a fuel limiting chamber.

From the foregoing, it will be apparent that the quantity of fuel supplied to the cylinders of an engine utilizing a set of the injectors, such as the injector illustrated in FIGS. 2—8, cannot be increased beyond a predetermined maximum and hence the maximum power output of the engine cannot be increased. Moreover, there is no simple way of tampering with the injectors to increase the fuel charge delivered to the cylinders beyond the predetermined maximum.

As heretofore mentioned, the check ball 119 is provided in the lower end of the vertical bore 117. Such check ball serves to minimize aeration of fuel in the injector and to prevent pressure waves from passing through the fuel passage 90 of the injector to the common supply bore 25a where such wave could possibly adversely affect the metering of fuel in adjacent injectors.

The Embodiment Shown in FIGS. 9—14

In FIGS. 9—14, inclusive, a modified form of fuel injector embodying the features of the invention is illustrated. The injector is adapted to be mounted in an injector bore having the same configuration as the bore 26 in the cylinder head 24 for the injector 30 illustrated in FIG. 1 and may, therefore, be used in engines designed for using the injector 30.

The injector comprises an elongated body 182 having a plunger bore 183 therein and including a nozzle having at least one and preferably a plurality of nozzle openings 186 therein through which fuel is injected into the associated cylinder. A plunger, indicated generally at 187, is reciprocably mounted in the bore 183.

The injector body 182, in the present instance, comprises a generally cylindrical body member 192 and a nozzle member 193 arranged in end-to-end relation. For holding the body member 192 and nozzle member 193 in end-to-end abutting relation, a tubular retainer 195 is provided. The upper end of the retainer 195 is internally threaded as at 196 for engagement with external threads 197 on the lower end of the body member 192 as shown in FIGS. 9, 12, 13 and 14. The lower end of the retainer 195 is provided with an internal flange 198 for engaging an annular, radially outwardly extending flange 199 on the nozzle member 193. Thus, when the retainer 195 is threaded onto the lower end of the body member 192, the nozzle member 193 is held in abutting end-to-end engagement therewith.

The plunger bore 183, in the present instance, has the same diameter throughout the length of the body member 192, and the interior of the nozzle member 193 constitutes a continuation of the plunger bore 183 but of a reduced diameter.

The plunger 187, which comprises a fuel injection means, may be provided with a spring retainer (not shown) providing a seat for the upper end of a coil spring 200. The lower end of the coil spring 200 may bear against the upper end face, indicated at 201, of the body member 192. The coil spring tends to urge the plunger 187 away from the nozzle openings 186, movement of the plunger 187 being controlled by an engine driven cam (not shown) and interconnecting linkage (also not shown).

As heretofore mentioned, the injector body member 192 has a fuel passage therein, indicated generally at 205, adapted to be connected to a source of fuel under pressure and having a connection for supplying fuel to a fuel injection chamber in the injector for injection therefrom through the nozzle openings 186 into the associated cylinder. To connect the fuel passage with the source, the injector body member 192 is provided with an external annular groove 206 adapted to be connected with the source of fuel under pressure, such as the fuel supply line 25a in the cylinder head 24, when the injector is fully seated in its mounting bore 26. The body member 192 is provided with a transverse bore 211 extending inwardly from the groove 206, and a plug 207 having a balancing orifice 208 therein is threaded into the counterbored outer end of the transverse bore 211. The bore 211 forms part of the fuel passage 205 and intersects the plunger bore 183.

The balancing orifice 208 in the plug 207 thus comprises one end of the fuel passage 205 and serves to meter the flow of fuel entering the passage. A filtering screen (not shown) may be mounted in the groove 206 exteriorly of the plug 207 to prevent foreign particles from entering the fuel passage. A pair of smaller annular grooves 213 and 214 may be provided on each side of the groove 206 for receiving seals, such as O-rings, to prevent leakage from the groove 206.

Assuming the injector plunger 187 is in the position thereof illustrated in FIGS. 9, 11 and 12, the tapered lower end, indicated at 216, of the plunger is shown as seated on a complementally shaped inner surface 217 in the nozzle member 193. When the plunger 187 is so positioned, fuel under pressure will flow through the balancing orifice 208 in the plug 207 and thence into the transverse bore 211 in the injector body member 192. The fuel then enters and annular space 222 in the plunger bore 183, the space 222 being provided by an annular groove 223 in the injector plunger 187. On entering the annular space 222, the flow splits, a part thereof entering a portion 226 of a transverse bore 226,227 (FIGS. 9 and 10) in the injector body 192, which intersects the plunger bore 183. From the portion 226, the flow proceeds downwardly in a vertical bore 229 in the body member 192 and past a feed hole 230 which extends inwardly from the bore 229 to the plunger bore 183. The inner end of the feed hole 230 is closed by the plunger 187 at this time.

On reaching the lower end of the vertical bore 229, the flow passes through a shallow groove 232 (FIGS. 10, 12 and 14) in the lower end face, indicated at 233, of the body member 192 and then flows upwardly in another vertical bore 234 (FIGS. 10 and 12) in the injector body member 192. On reaching the upper end of the bore 234, the flow passes inwardly in a portion 236 of another transverse bore 236,237 (FIGS. 10 and 12) in the body member 192. The transverse bore 236,237 intersects the plunger bore 183 at a point above the transverse bore 226,227. From the portion 236 of the transverse bore 236,237, the flow enters an annular groove 239 (FIGS. 11 and 12) in the plunger 187.

From the groove 239, the flow proceeds outwardly through another short, transverse bore 242 (FIGS. 10, 11 and 12) in the body member 192 and then through a restriction provided by an orifice 243 in a plug 244 mounted in the outer end of the transverse bore 242. The orifice 243 opens into a groove 246 around the body member 192, which is adapted to communicate with a drain such as the return bore 25b in the cylinder head 24 illustrated in FIG. 1. A groove 248 is provided around the injector body member 192 above the groove 246 for receiving a seal, such as an O-ring, to prevent leakage from the upper side of the groove 246 when the injector body is mounted in its bore in the cylinder head of the engine. The seal in the groove 214, heretofore described, prevents leakage from the lower side of the groove 246.

Thus, the aforementioned series of interconnected bores through the injector body 182, beginning with the orifice 208 in the plug 207 and extending to the feed hole 230, comprise a fuel passage or passages through the injector body 182 adapted to be connected to a source of fuel under pressure, namely the fuel supply bore 25a. The flow through such passages serves to purge the injector of any gases which may accumulate in the passages.

As heretofore mentioned, the fuel passage in the injector body 182 also includes a branch portion having its opposite ends communicating with the fuel passage. Thus, upon entering the annular space 222, the other part of the flow passes into the portion 227 of the transverse bore 226,227, the portion 227 comprising one end of the branch portion. From the portion 227, the flow proceeds downwardly in a vertical bore 252 in the injector body member 192. The lower portion of the bore 252 is counterbored as at 253 to constitute a cylinder, with a piston in the form of a ball 254 reciprocably mounted in the counterbore 253. The upper end of the counterbore 253 defines a shoulder 256 for limiting upward movement of the ball 254 in the counterbore 253. In FIG. 13, the ball is shown engaged with the shoulder 256.

A groove 257 (FIGS. 10 and 13) in the lower end face 233 of the body member 192 extends from the lower end of the counterbore 253 to another vertical bore 258 (FIGS. 10 and 12) in the body member 192. The flow proceeds upwardly in the vertical bore 258 and, on reaching the upper end of the bore, flows inwardly in the portion 237 of the transverse bore 236,237. The inner end of the transverse bore portion 237 communicates with the groove 239 (FIG. 12) in the plunger 187.

Fuel displaced from the branch portion thus unites with the flow through the fuel passage 205 at the groove 239 and the flow then proceeds outwardly through the transverse bore 242

(FIG. 11) and orifice 243 to drain. The bore portion 237 thus comprises the other end of the branch portion of the fuel passage in the injector body 182.

The branch portion of the fuel passage 205 thus comprises the portion 227 of the transverse bore 226,227, vertical bore 252, groove 257 (FIGS. 10 and 13), vertical bore 258 and portion 237 of transverse bore 236,237. In addition, the ball 254 and counterbore 253 constitute piston and cylinder means in the branch portion of the fuel passage.

In the injection cycle, the ball 254 will be moved downwardly in its bore 253 by an amount dependent upon the amount of fuel flowing downwardly in the vertical bore 252. During downward movement of the ball 254, fuel in the space below the ball 254 is displaced through the groove 257, vertical bore 258 and transverse bore portion 237 to drain by means of the transverse bore 242 and orifice 243 (FIG. 11). Downward movement of the ball 254 continues as the plunger 187 begins to move upwardly in its bore, from the position thereof illustrated in FIGS. 9, 11 and 12 toward the position thereof illustrated in FIGS. 13 and 14, such movement of the ball continuing until the groove 223 moves out of communication with the inner ends of the portions 226 and 227 of the transverse bore 226,227. When this occurs, the downward flow of fuel through the vertical bore 252 is interrupted. Consequently, no further downward movement of the ball 254 in its bore 253 will occur.

Continued upward movement of the plunger 187 in its bore 183 causes the groove 239 to move out of communication with the transverse bore portions 236 and 237 and also out of communication with the inner end of the transverse bore 242. Consequently, the flow to drain is cut off.

Further upward movement of the plunger 187 in the bore 183 toward the position thereof illustrated in FIGS. 13 and 14 causes a shoulder 262 defined by a reduced diameter portion 263 on the lower end of the plunger 187 to move past and uncover the feed hole 230. As the feed hole 230 is uncovered, the groove 223 moves over and provides communication between the inner end of a short transverse bore 264 (FIGS. 12 and 14) in the body member 192, below the transverse bore portion 237. At the same time that the feed hole 230 is uncovered, an annular groove 267 on the plunger 187 moves into communication with the inner ends of a pair of portions 272 and 273 (FIGS. 9 and 13) of another transverse bore 272,273 in the body member 192, the bore 272,273 intersecting the plunger bore 183 below the transverse bore portions 226 and 227. The outer end of the bore portion 272 intersects the vertical bore 229 (FIG. 13) and the outer end of the bore portion 273 intersects the vertical bore 252.

Under these conditions, the ball 254 begins to move upwardly in its bore 253. Since the space between the ball 254 and shoulder 256 communicates with the feed hole 230 through the bore 252, portions 272 and 273 of the transverse bore 272,273, groove 267, and vertical bore 229, a quantity of fuel equal to that displaced by upward movement of the ball 254 is forced through the feed hole 230 into the portion 376 of 276 of a fuel injection chamber 277. The feed hole 230 thus comprises a connection between the fuel passage 205 and the fuel injection chamber 277, and the space between the ball 254 and shoulder 256 constitutes another chamber 278, the function of which will be hereinafter described. In addition, the portion of the vertical bore 229 below the feed hole 230, groove 232, vertical bore 234, and portion 236 of the transverse bore 236,237, groove 239, transverse bore 242 and orifice 243 in the plug 244, comprise another connection between the fuel passage and drain.

The quantity of fuel transferred to the portion 276 of the fuel injection chamber 277 is subsequently forced by movement of the plunger 187 toward the lower portion, indicated at 282, of the fuel injection chamber 277, the portion 282 being defined by the interior of the nozzle member 193 and the tapered lower end 216 of the injection plunger 187. Such transfer of fuel to the portion 282 of the fuel injection chamber 277 occurs through a small annular space 283 between the reduced diameter portion 263 of the plunger and the adjacent wall, indicated at 284, of the nozzle member 193.

As mentioned above, the quantity of fuel supplied to the fuel injection chamber 277 is equal to that displaced by upward movement of the ball 254 from a lower position thereof in its bore 253 to an elevated position in the bore. However, since the maximum extent of the downward movement of the ball 254 is determined by the upper end face, indicated at 286 in FIGS. 9 and 13, of the nozzle member 193, the maximum volume of the chamber 278 is limited. The end face 286 of the nozzle member 193 thus comprises stop means for limiting movement of the ball 254 in one direction, namely, in a downward direction as viewed in FIGS. 9 and 13. Since the maximum degree of movement or stroke of the ball 254 is limited, a greater quantity of fuel than that contained in the chamber 278, when the ball 254 is in its lowermost position, cannot be transferred to the fuel injection chamber 277 for injection into the associated cylinder. The chamber 278 thus comprises a fuel limiting chamber.

From the foregoing, it will be apparent that the quantity of fuel supplied to the cylinders of an engine utilizing a set of injectors, such as the injector illustrated in FIGS. 9—14, cannot be increased beyond a predetermined maximum and hence the maximum power output of the engine cannot be increased. Moreover, there is no simple way of tampering with the injectors to increase the fuel charge delivered to the cylinders beyond the predetermined maximum.

The Embodiment Shown in FIGS. 15—18

In FIGS. 15—18, inclusive, another modified form of fuel injector embodying the features of the invention is illustrated. The injector therein illustrated is adapted to be mounted in an injector bore having the same configuration as the bore 26 in the cylinder head 24 for the injector 30 illustrated in FIG. 1.

The injector shown in FIGS. 15—18 comprises an elongated body 302 having a plunger bore 303 therein and including a nozzle having at least one and preferably a plurality of nozzle openings 306 therein through which fuel is injected into the associated cylinder. A plunger, indicated at 307, is reciprocably mounted in the bore 303.

The injector body 302, in the present instance, comprises a generally cylindrical body member 312 and a nozzle member 313 arranged in end-to-end relation. For holding the body member 312 and nozzle member 313 in abutting relation, a tubular retainer 315 is provided. The upper end of the retainer 315 is threaded as at 316, on the lower end of the body member 312 as shown in FIGS. 15 and 16. The lower end of the retainer 313 is provided with an internal flange 318 for engaging an annular, radially outwardly extending flange 319 on the nozzle member 313. Thus, when the retainer 315 is threaded onto the lower end of the body member 312, the nozzle member 313 is held in abutting, end-to-end engagement therewith.

The plunger bore 303, in the present instance, has the same diameter throughout the length of the body member 312, and the interior of the nozzle member 313 constitutes a continuation of the plunger bore 303 but of a reduced diameter.

The plunger 307, which comprises a fuel injection means, may be provided with a spring retainer (not shown) providing a seat for the upper end of a coil spring 308. The lower end of the coil spring 308 may bear against the upper end face, indicated at 321, of the body member 312. The coil spring tends to urge the plunger 307 away from the nozzle openings 306, movement of the plunger 307 being controlled by an engine driven cam (not shown) and interconnecting linkage (also not shown).

As heretofore mentioned, the injector body member 312 has a fuel passage therein, indicated generally at 325, adapted to be connected to a source of fuel under pressure and having a connection for supplying fuel to a fuel injection chamber in the injector for injection therefrom through the nozzle openings 306 into the associated cylinder. To connect the fuel passage with the source, the body member 312 is provided with an external annular groove 326 adapted to be connected with a source of fuel under pressure, such as the fuel supply line 25a in the cylinder head 24, when the injector is fully seated in its mounting bore 26. The body member 312 is provided with a transverse bore 331 extending inwardly from the groove 326, and a plug 327 (FIG. 18) having a balancing orifice 328 therein is threaded into the counterbored outer end of the transverse bore 331. The bore 331 forms part of the fuel passage 325 and intersects the plunger bore 303.

The balancing orifice 328 in the plug 327 thus comprises one end of the fuel passage 325 and serves to meter the flow of fuel entering the passage. A filtering screen (not shown) may be mounted in the groove 326 to prevent foreign particles from entering the fuel passage. A pair of smaller annular grooves 333 and 334 may be provided on each side of the groove 326 for receiving seals, such as 0-rings, to prevent leakage from the groove 326.

Assuming the injector plunger 307 is in the position thereof illustrated in FIGS. 15 and 18, the tapered, lower end, indicated at 336, of the plunger is shown seated on a complementally shaped inner surface 337 in the nozzle member 313. When the plunger 307 is so positioned, fuel under pressure will flow through the balancing orifice 328 in the plug 327 and thence into the transverse bore 331 in the injector body member 312. The fuel then enters an annular groove 343 in the injector plunger 307. From the groove 343, the flow enters the inner end of a short, transverse bore 344, (FIGS. 15 and 16) in the injector body member 312. The flow then proceeds outwardly in the transverse bore 344 to a juncture with the upper end of a vertical bore 346 and the lower end of an inclined bore 347 in the body member 312, where the flow splits.

Part of the flow proceeds downwardly in the bore 346 and, on reaching the lower end of the bore, enters one end of a semicircular groove 348 (FIGS. 15, 16 and 17) in the lower end face, of the body member 312. On reaching the opposite end of the groove 348, the flow enters the lower end of another vertical bore 349 in the body member 312 and flows upwardly therein past a feed hole 350 which extends inwardly from the bore 349 to the plunger bore 303. The inner end of the feed hole 350 is closed by the plunger 307 at this time.

On reaching the upper end of the vertical bore 349, the flow then passes inwardly in a portion 352 of a transverse bore 352,353 in the body member 312. The transverse bore 352,353 intersects the plunger bore 303 at a point above the transverse bore 331. From the portion 352 of the transverse bore 352,353, the flow enters another annular groove 357 in the plunger 307.

From the groove 357, the flow proceeds outwardly through a short transverse bore 358 (FIG. 18) in the body member 312 and then passes through a restriction provided by an orifice 362 in a plug 363 mounted in the outer end of the transverse bore 358. The orifice 362 opens into a groove 364 around the body member 312, which is adapted to communicate with a drain such as the return bore 25b in the cylinder head 24 illustrated in FIG. 1. A shallow groove 366 is provided around the injector body member 312 above the groove 364 for receiving a seal, such as an 0-ring, to prevent leakage from the upper side of the groove 364 when the injector body is mounted in its bore in the cylinder head of the engine. The seal in the groove 334 prevents leakage from the lower side of the groove 364.

Thus, the aforementioned series of interconnected bores through the injector body 302, beginning with the orifice 328 in the plug 327 and extending to the feed hole 350, comprise a fuel passage or passages adapted to be connected to a source of fuel under pressure such as the fuel supply bore 25a. The flow through such passages serves to purge the injector of any gases which may accumulate in the passages.

As heretofore mentioned, the fuel passage in the injector body 302 also includes a branch portion having its opposite ends communicating with the fuel passage. Thus, upon reaching the juncture of the transverse bore 344 with the adjacent ends of the bores 346 and 347, part of the flow proceeds upwardly into the lower end of the inclined bore 347 which comprises one end of the branch portion. The upper portion of the bore 347 is counterbored as at 366 to constitute a cylinder, with a piston in the form of a ball 367 reciprocably mounted in the counterbore 366. The lower end of the counterbore 366 defines a shoulder 368 for limiting downward movement of the ball 367 in the counterbore 366. In FIG. 16, the ball 367 is shown engaged with the shoulder 368.

The upper end of the counterbore 366 is threaded to receive a plug 372, the plug 372 being positioned in the counterbore 366 above the portion 353 of the transverse bore, 352,353. The outer end of the transverse bore portion 353 intersects the counterbore 366 so that the latter also communicates with the groove 357 in the plunger 307 when the plunger is in the position thereof illustrated in FIG. 15.

Fuel displaced from the branch portion thus unites with the flow through the fuel passage 325 at the groove 357 and then proceeds outwardly through the transverse bore 358 (FIG. 18) and orifice 362 to drain. The transverse bore portion 353 thus comprises the other end of the branch portion of the fuel passage in the injector body 312.

The branch portion of the fuel passage 325 thus comprises the inclined bore 347, counterbore 366 and portion 353 of transverse bore 352,353. In addition, the ball 367 and counterbore 366 constitute piston and cylinder means in the branch portion of the fuel passage.

In the injection cycle, the ball 367 will be moved upwardly in its bore 366 by an amount dependent upon the amount of fuel flowing upwardly in the inclined bore 347. During upward movement of the ball 367, fuel in the space above the ball is displaced through the portion 353 of the transverse bore 352,353 to the groove 357 in the plunger 307, from whence it flows to drain through the transverse bore 358 (FIG. 18) and orifice 362. Upward movement of the ball 367 in its bore continues as the plunger 307 begins to move upwardly in its bore 303, from the position thereof illustrated in FIGS. 15 and 18 toward the position thereof illustrated in FIG. 16, such movement of the ball continuing until the groove 357 moves out of communication with the inner ends of the portions 352 and 353 of the transverse bore 352,353. When this occurs, the flow of fuel to drain is interrupted. Consequently, no further upward movement of the ball 367 in its bore 366 will occur.

Continued upward movement of the plunger 307 in its bore 303 causes the groove 343 to move out of communication with the inner end of the transverse bore 344 and also causes the groove 343 to move into communication with the inner end of another transverse bore 373 in the injector body member 312. The bore 373 is positioned somewhat below the transverse bore 352,353.

At the same time that the groove 343 moves into communication with the inner end of the bore 373, a shoulder 374 defined by a reduced diameter portion 376 on the lower end of the plunger 307 moves past and uncovers the feed hole 350.

Under these conditions, fuel under pressure from the groove 343 flows outwardly in the bore 373 and into the counterbore 366 at a point above the ball 367. Consequently, the ball 367 is caused to move downwardly in its bore toward the shoulder 368. Since the space between the ball 367 and shoulder 368 communicates with the feed hole 350 through the bore 347, connected bore 346, semicircular groove 348, and the lower portion of vertical bore 349, a quantity of fuel equal to that displaced by downward movement of the ball is forced through the feed hole 350 into a portion 377 of a fuel injection chamber 378 (FIG. 16). The feed hole 350 thus comprises a connection between the fuel passage 325 and the fuel injection chamber 378, and the space between the ball 367 and the shoulder 368 constitutes another chamber 381 (FIG. 15), the function of which will be hereinafter described. In addition, the portion of the vertical bore 349 above the feed hole 350, the portion 352 of the transverse bore 352,353 the groove 357, the transverse bore 358 and orifice 362 comprise another connection between the fuel passage and drain.

The quantity of fuel transferred to the portion 377 of the fuel injection chamber 378 is subsequently forced by movement of the plunger 307 toward the lower portion, indicated at 382, of the fuel injection chamber 378, the portion 382 being defined by the interior of the nozzle member 313 and the tapered lower end 336 of the injector plunger 307. Such transfer of fuel to the portion 382 of the fuel injection chamber 378 occurs through a small annular space 383 between the reduced diameter portion 376 of the plunger 307 and the adjacent wall indicated at 384 of the nozzle member 313.

As mentioned above, the quantity of fuel supplied to the fuel injection chamber 378 is equal to that displaced by downward movement of the ball 367 from an upper position thereof in its bore 366 to a lower position in the bore. However, the maximum extent of upward movement of the ball 367 is determined by an extension or stem 387 on the lower end of the plug 372. Consequently, the maximum volume of the chamber 381 is limited. Moreover, the extension 387 comprises stop means for limiting movement of the ball 367 in one direction, namely, in an upward direction as viewed in FIGS. 15 and 16. Since the maximum extent of movement of the ball 367 is limited, a greater quantity of fuel than that contained in the chamber 381, when the ball 367 is in its uppermost position, cannot be transferred to the fuel injector chamber 378 for injection into the associated cylinder. The chamber 381 thus comprises a fuel limiting chamber.

As heretofore mentioned, the plug 372 is threaded into the upper end of the counterbore 366. The position of the plug 372 may be adjusted to vary the maximum volume of the chamber 381. The upper end of the counterbore 366 is enlarged and threaded as at 388 to receive another plug 389. The plug 389 thus renders the plug 372 inaccessible, and the plug 389 is in itself inaccessible since it is in the upper end face 321 of the injector body member 312 and is thus covered by the lower end of the plunger spring 308. However, the position of the plug 372 can be adjusted if need be in order to adapt the injector to the maximum fuel requirements of a particular engine.

From the foregoing, it will be apparent that the quantity of fuel supplied to the cylinders of an engine utilizing a set of injectors, such as the injector illustrated in FIGS. 15—18, cannot be easily increased beyond a predetermined maximum and hence the maximum power output of the engine likewise cannot be increased. Moreover, there is no simple way of tampering with the injectors to increase the fuel charge delivered to the cylinders beyond the predetermined maximum. We claim:

1. An injector for injecting fuel into a cylinder of an internal combustion engine, comprising an injector body having a fuel passage therein and a fuel injection chamber having an opening adapted to communicate with said cylinder, said fuel passage being adapted to be connected to a source of fuel under pressure and having a connection with said fuel injection chamber, means for injecting fuel from said fuel injection chamber through said opening into said cylinder, and a piston connected to said fuel passage and being shiftable in one direction by the pressure of the fuel in said fuel passage by an amount proportional to said pressure during one portion of the operating cycle of said injector to create a space connected to and receiving fuel from said passage, said piston being shiftable in the opposite direction by the pressure of the fuel in said passage during another portion of the operating cycle of said injector to transfer a quantity of fuel equal to the quantity of fuel in said space to said fuel injection chamber for injection into said cylinder.

2. The injector of claim 1, including stop means for limiting movement of said piston in said one direction and consequently the maximum size of said space, a said stop means thereby limiting the maximum quantity of fuel injected into said cylinder during each operating cycle.

3. The injector of claim 2, in which said injector body includes a body member and a barrel member in end-to-end relation, said space being provided in said barrel member adjacent said body member, and said stop means comprises a portion of the end face of said body member adjacent said space.

4. The injector of claim 2, in which said injector body includes a body member and a nozzle member in end-to-end relation, said space being provided in said body member adjacent said nozzle member, and said stop means comprises a portion of the end face of said nozzle member adjacent said body member.

5. The injector of claim 2, in which said stop means comprises a plug threaded into said injector body and extending into said fuel passage, the position of said plug being adjustable to permit adjustment of the maximum quantity of fuel supplied to said injection chamber.

6. The injector of claim 2, including another stop means for limiting movement of said piston in said opposite direction.

7. The injector of claim 6, in which said second stop means comprises a shoulder in said fuel passage at one end of said space.

8. The injector of claim 1, in which said fuel passage includes a branch portion, and said piston is mounted in said branch portion.

9. The injector of claim 8, in which said fuel injecting means is operable to provide communication between one end of said branch portion and said fuel passage during said one portion of the operating cycle of said injector, said fuel injecting means also being operable to provide communication between the other end of said branch portion and said fuel passage during said other portion of the operating cycle of said injector.

10. The injector of claim 9, in which said means for injecting fuel into said cylinder comprises a plunger reciprocably mounted in said injector body, and said plunger selectively provides communication between the ends of said branch portion and said fuel passage.

11. The injector of claim 9, in which said fuel passage includes another connection adapted to extend to a drain, and said fuel injection means is operable to establish flow through said other connection and to provide said communication between said one end of said branch portion and said fuel passage during said one portion of the operating cycle of said injector, said fuel injection means also being operable to interrupt the flow through said other connection and to provide said communication between said other end of said branch portion and said fuel passage during said other portion of the operating cycle of said injector.

12. The injector of claim 11, in which said fuel injection means comprises a plunger reciprocably mounted in said injector body and having a pair of annular grooves therein, one of said grooves being operable when said plunger is in its position for said one portion of the operating cycle of said injector to provide said communication between said one end of said branch portion and said fuel passage and said other groove being operable to establish flow through said other connection, said one groove also being operable when said plunger is in its position for said other portion of the operating cycle of said injector to provide said communication between said other end of said branch portion and said fuel passage and said other groove being ineffective to provide flow through said other connection.

13. The injector of claim 8, in which said fuel passage has another connection adapted to extend to a drain, and a restriction is provided in said other connection for restricting the flow of fuel in said passage to said drain.

14. The injector of claim 13, in which said restriction is effective during said one portion of the operating cycle of said injector to maintain pressure in said branch portion tending to shift said piston means in said one direction.

15. The injector of claim 13, in which said restriction is located in said fuel passage adjacent said connection thereof with said fuel injection chamber.

16. An injector for injecting fuel into a cylinder of an internal combustion engine comprising an injector body having a fuel injection chamber provided with an opening adapted to communicate with said cylinder, a plunger reciprocably mounted in said injector body for injecting fuel from said fuel injection chamber through said opening into said cylinder, and piston and cylinder means in said injector body and having its opposite ends adapted to be selectively connected to a source of fuel under pressure for shifting the piston of said piston and cylinder means and to connect one end of said means with said fuel injection chamber when the opposite end of said means is connected to said source.

17. The injector of claim 1, including means for preventing gas from passing from said fuel injection chamber into said passage.

18. The injector of claim 17, in which said preventing means comprises a check valve in said fuel passage adjacent the connection thereof with said fuel injection chamber.

19. An injector for injecting fuel into a cylinder of an internal combustion engine comprising an injector body having a fuel injection chamber provided with an opening adapted to communicate with said cylinder, a plunger reciprocably mounted in said injector body and operable to effect injection of fuel from said fuel injection chamber into said cylinder, said injector body also having a bore therein and a piston shiftably mounted in said bore and defining a fuel limiting chamber at one side of said piston, said fuel limiting chamber having a predetermined maximum volume determined by the position of said piston when the latter is moved fully in one direction, and said injector body further having fuel passages adapted to connect said fuel limiting chamber with a source of fuel under pressure for supplying fuel to said fuel limiting chamber to move said piston in said one direction during one portion of the operating cycle of said injector, said fuel passages including a connection between said fuel limiting chamber and said fuel injection chamber, and said piston being movable in the opposite direction to transfer fuel from said fuel limiting chamber through said connection to said fuel injection chamber for injection into said cylinder in response to movement of said plunger during another portion of the operating cycle of said injector.

20. The injector of claim 19, in which said fuel passages include another connection adapted to extend from the opposite side of said piston to a drain, and said plunger is operable during said one portion of the operating cycle of said injector to provide for flow through said other connection.

21. The injector of claim 20, in which said one connection has a portion communicating with said other connection, and a restriction is provided in said portion for restricting flow through said portion to drain. 0740 1 2

17.3